(12) United States Patent
Lei et al.

(10) Patent No.: US 12,159,224 B2
(45) Date of Patent: Dec. 3, 2024

(54) ENTITY DISAMBIGUATION USING GRAPH NEURAL NETWORKS

(71) Applicant: International Business Machines Corporation, Armonk, NY (US)

(72) Inventors: Chuan Lei, Cupertino, CA (US); Alina Vretinaris, Stuttgart (DE); Vasilis Efthymiou, San Jose, CA (US); Fatma Ozcan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1016 days.

(21) Appl. No.: 17/130,107

(22) Filed: Dec. 22, 2020

(65) Prior Publication Data
US 2022/0207343 A1    Jun. 30, 2022

(51) Int. Cl.
*G06N 3/08*  (2023.01)
*G06F 16/2452*  (2019.01)
*G06N 3/045*  (2023.01)

(52) U.S. Cl.
CPC ......... *G06N 3/08* (2013.01); *G06F 16/24526* (2019.01); *G06N 3/045* (2023.01)

(58) Field of Classification Search
CPC ..... G06N 3/08; G06N 3/045; G06F 16/24526
See application file for complete search history.

(56) References Cited

U.S. PATENT DOCUMENTS

| | | | |
|---|---|---|---|
| 2011/0106807 A1* | 5/2011 | Srihari | G06F 16/288 |
| | | | 707/E17.046 |
| 2017/0140059 A1 | 5/2017 | Li et al. | |
| 2017/0337268 A1* | 11/2017 | Ait-Mokhtar | G06F 16/3344 |
| 2019/0220524 A1 | 7/2019 | Costabello et al. | |
| 2019/0354544 A1* | 11/2019 | Hertz | G06N 5/025 |

FOREIGN PATENT DOCUMENTS

| | | |
|---|---|---|
| CN | 104462501 A | 3/2015 |
| CN | 104035917 B | 7/2017 |
| CN | 107102989 A | 8/2017 |
| CN | 106295796 B | 12/2018 |

(Continued)

OTHER PUBLICATIONS

Krivosheev, Evgeny, Mattia Atzeni, Katsiaryna Mirylenka, Paolo Scotton, and Fabio Casati. "Siamese graph neural networks for data integration." arXiv preprint arXiv:2001.06543 (2020). (Year: 2020).*

(Continued)

*Primary Examiner* — Casey R. Garner
(74) *Attorney, Agent, or Firm* — Amin, Turocy & Watson, LLP

(57) ABSTRACT

Computer-implemented techniques for entity disambiguation using graph neural networks (GNNs) are provided. According to an embodiment, computer implemented method can comprise receiving, by a system operatively coupled to a processor, an unstructured text snippet comprising an unknown term. The method further comprises employing, by the system, a heterogeneous GNN trained on a knowledge graph associated with a domain of the unstructured text snippet to facilitate identifying one or more similar terms included within the knowledge graph for the unknown term.

22 Claims, 12 Drawing Sheets

(56) References Cited

FOREIGN PATENT DOCUMENTS

| | | |
|---|---|---|
| CN | 110580337 A | 12/2019 |
| CN | 106776564 B | 4/2020 |
| CN | 106874378 B | 6/2020 |
| CN | 111259653 A | 6/2020 |
| WO | 2016210203 A1 | 12/2016 |
| WO | 2019220128 A1 | 11/2019 |

OTHER PUBLICATIONS

Kordjamshidi, Parisa, Sameer Singh, Daniel Khashabi, Christos Christodoulopoulos, Mark Summons, Saurabh Sinha, and Dan Roth. "Relational learning and feature extraction by querying over heterogeneous information networks." arXiv preprint arXiv:1707.07794 (2017). (Year: 2017).*

Cao, et al., "Neural Collective Entity Linking," COLING '18, arXiv:1811.08603v1 [cs.CL] Nov. 21, 2018, 12 pages, Dept. of Computer Science and Technology, Tsinghua University, China 100084.

Wu, et al., "Dynamic Graph Convolutional Networks for Entity Linking," WWW '20, Apr. 20-24, 2020, Taipei, Taiwan, 11 pages.

Wright, et al., "NormCo: Deep Disease Normalization forBiomedical Knowledge Base Construction," Automated Knowledge Base Construction (2019), Nov. 17, 2018, 19 pages.

Dai, et al., "Fine-grained Concept Linking using Neural Networks in Healthcare," SIGMOD '18: Proceedings of the 2018 International Conference on Management of Data, May 1, 2018 pp. 51-66.

Zwicklbauer, et al., "DoSeR—A Knowledge-Base-Agnostic Framework forEntity Disambiguation Using Semantic Embeddings," May 14, 2016, 15 pages, University of Passau, Passau 94032, Germany.

Mudgal, et al., "Deep Learning for Entity Matching: A Design Space Exploration," SIGMOD'18, Jun. 10-15, 2018, Houston, TX, USA, 16 pages.

Arora, et al., "A Simple but Tough-To-Beat Baseline for Sentence Embeddings," Published as a conference paper at ICLR 2017, Last Accessed: Oct. 19, 2020, 16 pages.

Auer, et al., "DBpedia: A Nucleus for a Web of Open Data," Conference Paper—Jan. 2007, Last Accessed: Oct. 19, 2020, 15 pages.

Baader, et al., "The Description Logic Handbook," Cambridge University Press 2003, Last Accessed: Oct. 19, 2020, 573 pages.

Bodenreider, "The UniFled Medical Language System (UMLS): integrating biomedical terminology," Nucleic Acids Research, 2004, vol. 32, Database issue D267-D270, 4 pages.

Bollacker, et al., "Freebase: A Collaboratively Created Graph Database For Structuring Human Knowledge," SIGMOD'08, Jun. 9-12, 2008, Vancouver, BC, Canada, 3 pages.

Cao, et al., "Neural Collective Entity Linking," arXiv:1811.08603v1 [cs.CL] Nov. 21, 2018, 12 pages.

Cen, et al., "Representation Learning for Attributed Multiplex Heterogeneous Network," arXiv:1905.01669v2 [cs.SI] May 20, 2019, 11 pages.

Dai, et al., "Fine-grained Concept Linking using Neural Networks in Healthcare," SIGMOD'18, Jun. 10-15, 2018, Houston, TX, USA, 16 pages.

Devlin, et al., "BERT: Pre-training of Deep Bidirectional Transformers for Language Understanding," arXiv:1810.04805v2 [cs.CL] May 24, 2019, 16 pages.

Dong, et al., "metapath2vec: Scalable Representation Learning for Heterogeneous Networks," KDD'17, Aug. 13-17, 2017, Halifax, NS, Canada, 10 pages.

Fan, et al., "Metapath-guided Heterogeneous Graph Neural Network for Intent Recommendation," KDD '19, Aug. 4-8, 2019, Anchorage, AK, USA, 9 pages.

Fu, et al., "MAGNN: Metapath Aggregated Graph Neural Network for Heterogeneous Graph Embeddin," arXiv:2002.01680v2 [cs.SI] Mar. 31, 2020, 11 pages.

Gardner, et al., "AllenNLP: A Deep Semantic Natural Language Processing Platform," arXiv:1803.07640v2 [cs.CL] May 31, 2018, 6 pages.

Golbeck, et al., "The National Cancer Institute's Thesaurus and Ontology," 6 pages.

Hamilton, et al., "Inductive Representation Learning on Large Graphs," arXiv:1706.02216v4 [cs.SI] Sep. 10, 2018, 19 pages.

ibm.com, "Watson Natural Language Understanding—Overview," https://www.ibm.com/cloud/watson-natural-language-understanding1, Retrieved from the Internet: Oct. 19, 2020, 7 pages.

Johnson, et al., "Data Descriptor: MIMIC-III, a freely accessible critical care database," arXiv:1706.02216v4 [cs.SI] 9 pages.

Kingma, et al., "ADAM: A Method for Stochastic Optimization," Published as a conference paper at ICLR 2015, 15 pages.

Kipf, et al., "Semi-Supervised Classification With Graph Convolutional Networks," arXiv:1609.02907v4 [cs.LG] Feb. 22, 2017, 14 pages.

Lample, et al., "Neural Architectures for Named Entity Recognition," arXiv:1603.01360v3 [cs.CL] Apr. 7, 2016, 11 pages.

Li, et al., "Entity Disambiguation with Linkless Knowledge Bases," WWW 2016, Apr. 11-15, 2016, Montréal, Québec, Canada, 10 pages.

Li, et al., "Gated Graph Sequence Neural Networks," arXiv:1511.05493v4 [cs.LG] Sep. 22, 2017, 20 pages.

Manning, et al., "The Stanford CoreNLP Natural Language Processing Toolkit," Last Accessed: Oct. 20, 2020, 6 pages.

Peng, et al., "Transfer Learning in Biomedical Natural Language Processing: An Evaluation of BERT and ELMo on Ten Benchmarking Datasets," rearXiv: 1906.05474v2 [cs.CL] Jun. 18, 2019, 8 pages.

Peters, et al., "Deep contextualized word representations," rearXiv: 1906.05474v2 [cs.CL] Jun. 18, 2019, 15 pages.

Ristoski, et al., "RDF2Vec: RDF Graph Embeddings and Their Applications," copyright 2016—IOS Press and the authors, 25 pages.

Schlichtkrull, et al., "Modeling Relational Data with Graph Convolutional Networks," arXiv:1703.06103v4 [stat. ML] Oct. 26, 2017, 9 pages.

Shen, et al., "Entity Linking with a Knowledge Base: Issues, Techniques, and Solutions," Last Accessed: Oct. 20, 2020, 20 pages.

snomed.org, "5 Step Briefing," Last Accessed: Oct. 20, 2020, 2 pages.

Sun, et al., "PathSim: Meta PathBased TopK Similarity Search in Heterogeneous Information Networks," The 37th International Conference on Very Large Data Bases, Aug. 29 Sep. 3, 2011, Seattle, Washington, 12 pages.

Sun, et al., "Modeling Mention, Context and Entity with Neural Networks for Entity Disambiguation," Last Accessed: Oct. 20, 2020, 7 pages.

Velickovic, et al., "Graph Attention Networks," Published as a conference paper at ICLR 2018, 12 pages.

Wang, et al., "Heterogeneous Graph Attention Network," arXiv:1903.07293v1 [cs.SI] Mar. 18, 2019, 11 pages.

Wishart, et al., "DrugBank: a comprehensive resource for in silico drug discovery and exploration," Nucleic Acids Research, 2006, vol. 34, Database issue doi:10.1093/nar/gkj067, 5 pages.

Wright, et al., "NormCo: Deep Disease Normalization for Biomedical Knowledge Base Construction," Last Accessed: Oct. 20, 2020, 19 pages.

Anonymous, "GRAPH2SEQ: Graph To Sequence Learning With Attention-Based Neural Networks," Under review as a conference paper at ICLR 2019, 17 pages.

Xu, et al., "SQL-to-Text Generation with Graph-to-Sequence Model," arXiv: 1809.05255v2 [cs.CL] Feb. 12, 2019, 6 pages.

Xu, et al., "Exploiting Rich Syntactic Information for Semantic Parsing with Graph-to-Sequence Model," arXiv:1808.07624v1 [cs.CL] Aug. 23, 2018, 7 pages.

Yamada, et al., "Joint Learning of the Embedding of Words and Entities for Named Entity Disambiguation," arXiv:1601.01343v4 [cs.CL] Jun. 10, 2016, 10 pages.

Shi, et al., "Heterogeneous Graph Neural Network for Recommendation," arXiv:2009.00799v1 [cs.SI] Sep. 2, 2020, 8 pages.

(56) References Cited

OTHER PUBLICATIONS

Zhang, et al., "Link Prediction Based on Graph Neural Networks," 32nd Conference on Neural Information Processing Systems (NeurIPS 2018), Montreal, Canada, 11 pages.

Zwicklbauer, et al., "DoSeR—A Knowledge-Base-Agnostic Framework for Entity Disambiguation Using Semantic Embeddings," Last Accessed: Oct. 20, 2020, 15 pages.

* cited by examiner

Table 200

| Notation | Description |
|---|---|
| $\mathcal{H}$ | Heterogeneous information network |
| $\mathcal{H}_R$ | Knowledge graph (reference graph) |
| $\mathcal{V}_R$ | The set of nodes in $\mathcal{H}_R$ |
| $\mathcal{E}_R$ | The set of edges in $\mathcal{H}_R$ |
| $\mathcal{S}_R$ | Network schema of $\mathcal{H}_R$ |
| $v$ | A node $v \in \mathcal{V}_R$ |
| $\mathcal{H}_Q$ | Query graph |
| $\mathcal{V}_Q$ | The set of nodes in $\mathcal{H}_Q$ |
| $\mathcal{E}_Q$ | The set of edges in $\mathcal{H}_Q$ |
| $v'$ | A node $v' \in \mathcal{V}_Q$ |
| $h_v^{attr}$ | Initial node feature |
| $h_v$ | Hidden state (embedding) of node $v$ |
| $P_r$ | A metapath |
| $\mathcal{P}_R$ | The set of metapaths $\{P_1, P_2, \ldots, P_M\}$ |
| $P(u,v)$ | A metapath instance connecting nodes $u$ and $v$ |
| $\mathcal{N}_v$ | The set of neighbors of node $v$ |
| $\mathcal{N}_v^{P_r}$ | The set of neighbors of node $v$ based on $P_r$ |

FIG. 2

Algorithm 1 Query Graph Construction

Input: A knowledge graph $\mathcal{H}_R$, a network schema $S_R$, a text snippet $TS$

Output: A query graph $\mathcal{H}_Q$

1: $\mathcal{H}_Q \leftarrow \emptyset$
2: $EM \leftarrow NER(TS)$ //get all entity mentions
3: $EM_{match} \leftarrow match(EM, \mathcal{H}_R)$ //get matching entity mentions
4: $EM_{unknown} \leftarrow EM \setminus EM_{match}$
5: $\mathcal{H}_Q.addNodes(EM_{match})$
6: for each pair of nodes $u', v' \in \mathcal{V}_Q$ do
7: $\quad u \leftarrow EM_{match}.getMatch(u')$
8: $\quad v \leftarrow EM_{match}.getMatch(v')$
9: $\quad$ if $e = (u,v) \in \mathcal{E}_R$ then
10: $\quad\quad \mathcal{H}_Q.addEdge(u', v', e.type)$
11: for each $em \in EM_{unknown}$ do
12: $\quad et \leftarrow em.getEntityType()$
13: $\quad EdgeTypes \leftarrow S_R.getEdgeTypes(et)$
14: $\quad EntityTypes \leftarrow S_R.getEntity(EdgeTypes)$
15: $\quad u' \leftarrow \mathcal{H}_Q.addNodes(em)$ //add $em$ to $\mathcal{H}_Q$ and assign it to the node $u'$
16: $\quad$ for each $v' \in \mathcal{V}_Q$ do
17: $\quad\quad$ if $v'.getType() \in EntityTypes$ then
18: $\quad\quad\quad edgeType \leftarrow EdgeTypes.get(v'.getType(), et)$
19: $\quad\quad\quad \mathcal{H}_Q.addEdge(u', v', edgeType)$
20: return $\mathcal{H}_Q$

FIG. 7

ENTITY DISAMBIGUATION USING GRAPH NEURAL NETWORKS

TECHNICAL FIELD

This application relates to entity disambiguation and more particularly to entity disambiguation using graph neural networks (GNNs).

BACKGROUND

To facilitate decision making, domain-specific knowledge graphs (KGs) are expected to provide high-quality information, distilled from literature. Traditionally, an editorial team ensures the quality and consistency of the KG. However, such process tends to be labor-intensive and error-prone, even with professional editorial entity. Word discrepancies between the entities in the KG and the choice of words in the text snippets created by the editorial entity, are often encountered during the KG curation and maintenance processes.

For example, medical KGs offer deep domain specialization with rich and detailed information, which are known to be vital for domain-specific tasks like clinical decision support and medical question answering. The creation and curation of such KGs often depend on robust editorial teams, who periodically evaluate biomedical literature and regulatory actions to ensure the KGs contain up-to-date medical information.

Typically, the semantics of a KG are expressed in the form of an ontology, providing a graph-structured representation of entities and their relationships. It is vital that the information in a medical KG use a standard and well-understood terminology of the domain. To ensure this, the editorial team extracts information from the medical literature and creates and edits text snippets to be inserted into the medical KG. However, this editorial process is error-prone, as discrepancies are often introduced due to various writing styles, acronyms, abbreviations, typos and colloquial terms. For example, an editorial entity member may mention "renal disorder" or "kidney disease" in a text snippet, with the intention to refer to the entity that is defined as "nephrosis" in the KG. Similarly, "cah" in a text snippet may refer to the entity defined as "chronic active hepatitis." As a result, the entity mentions in the text snippets may deviate significantly from the entities in the medical KG using standardized terminologies. Such discrepancies make it difficult to link the entity mentions to the intended entities in the KG, introducing noise, duplicates, and ambiguity, eventually decreasing the value of the data stored in the KG.

The problem of identifying, and hence preventing, such ambiguous mentions to entities in a KG is a problem known as entity disambiguation. At the core of entity disambiguation lies the problem of understanding the semantic relevance between the entity mentions in the text snippet and the entities described in the KG. Existing entity disambiguation techniques rely on either textual context information from the surrounding words or semantic signals from an entity graph with laboring feature engineering. They fail to take full advantage of the rich semantic and structural information among the entities in the KG. Accordingly, more efficient and accurate entity disambiguation techniques are needed to help the editorial entity to ensure the entities in the text snippets are consistent with the ones in the existing KG.

SUMMARY

The following presents a summary to provide a basic understanding of one or more embodiments of the present disclosure. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products are provided that facilitate entity disambiguation using GNNs.

According to an embodiment, a computer implemented method can comprise receiving, by a system operatively coupled to a processor, an unstructured text snippet comprising an unknown term. The method further comprises employing, by the system, a GNN trained on a KG associated with a domain of the unstructured text snippet to facilitate identifying one or more similar terms included within the KG for the unknown term.

In one or more implementations the method can further comprise, modeling, by the system, the unstructured text snippet as a query graph comprising nodes for terms included in the text snippet corresponding to entities, including a node for the unknown term, and edges connecting the nodes based on relationships between the entities. The modeling can comprise extracting, by the system, the entities from the text snippet, assigning, by the system, types to the entities, and determining, by the system, the relationships between the entities based on a defined graph schema for the KG.

The method can further comprise applying, by the system, the query graph as input into the graph neural network to generate a vector representation of the unknown term, and applying, by the system, the KG as additional input into the graph neural network to generate vector representations of target terms in the KG. In some implementations, the graph neural network comprises a Siamese network. A Siamese network in essence is a twin neural network which consists of one GNN for the KG and one GNN for the query graph. With these implementations, the applying the query graph and the applying the KG can comprise simultaneously inputting, by the system, the query graph and the KG into two identical instances of the graph neural network, and generating, by the system, the vector representation and the vector representations based on shared parameters between the query graph and the KG.

The method can further comprise scoring, by the system, the target terms with similarity scores based on degrees of similarity between the vector representations and the vector representation, and identifying, by the system, the one or more similar terms based on the similarity scores.

The graph neural network comprises a term embedding layer, a neighbor aggregation layer and a metapath aggregation layer. At a high-level, the term embedding layer that employs a pre-trained word embedding model to generate term embeddings for the entities in the query graph. The neighbor aggregation layer aggregates metapath-based neighbors of the unknown term and employs a weighted sum of the metapath-based neighbors to determine vector representations of respective metapaths of the unknown term. The metapath aggregation layer further combines the respective metapaths based on weighted sum of the respective metapaths to generate the vector representation of the unknown term.

According to another embodiment, a computer implemented method can comprise training, a system operatively coupled to a processor, a GNN to generate vector representations for nodes in a KG modeled as a heterogeneous information network. The method further comprises employing, by the system, the GNN for entity disambiguation of an unknown entity in a text snippet associated with the KG.

In various implementations, the employing comprises modeling, by the system, the text snippet as a query graph in accordance with graph schema of the heterogeneous information network, and applying, by the system, the query graph as input into the graph neural network to generate a vector representation for the unknown term. With these embodiments, the method can further comprise determining, by the system, degrees of similarity between the vector representation (for the unknown term) and the vector representations (for the terms in the KG) to facilitate identifying a term in the KG that corresponds to the unknown term. In one or more embodiment, the graph neural network comprises a term embedding layer that generates term embeddings of the nodes, a neighbor aggregation layer that learns metapath embeddings of the nodes, and a metapath aggregation layer that aggregates the metapath embeddings.

In some embodiments, elements described in connection with the disclosed computer-implemented methods can be embodied in different forms such as a computer system, a computer program product, or another form.

DESCRIPTION OF THE DRAWINGS

FIG. 2 presents a table summarizing the notations used herein.

FIG. 7 provides an algorithm defining the query graph construction process in accordance with one or more embodiments.

DETAILED DESCRIPTION

Figure 1:
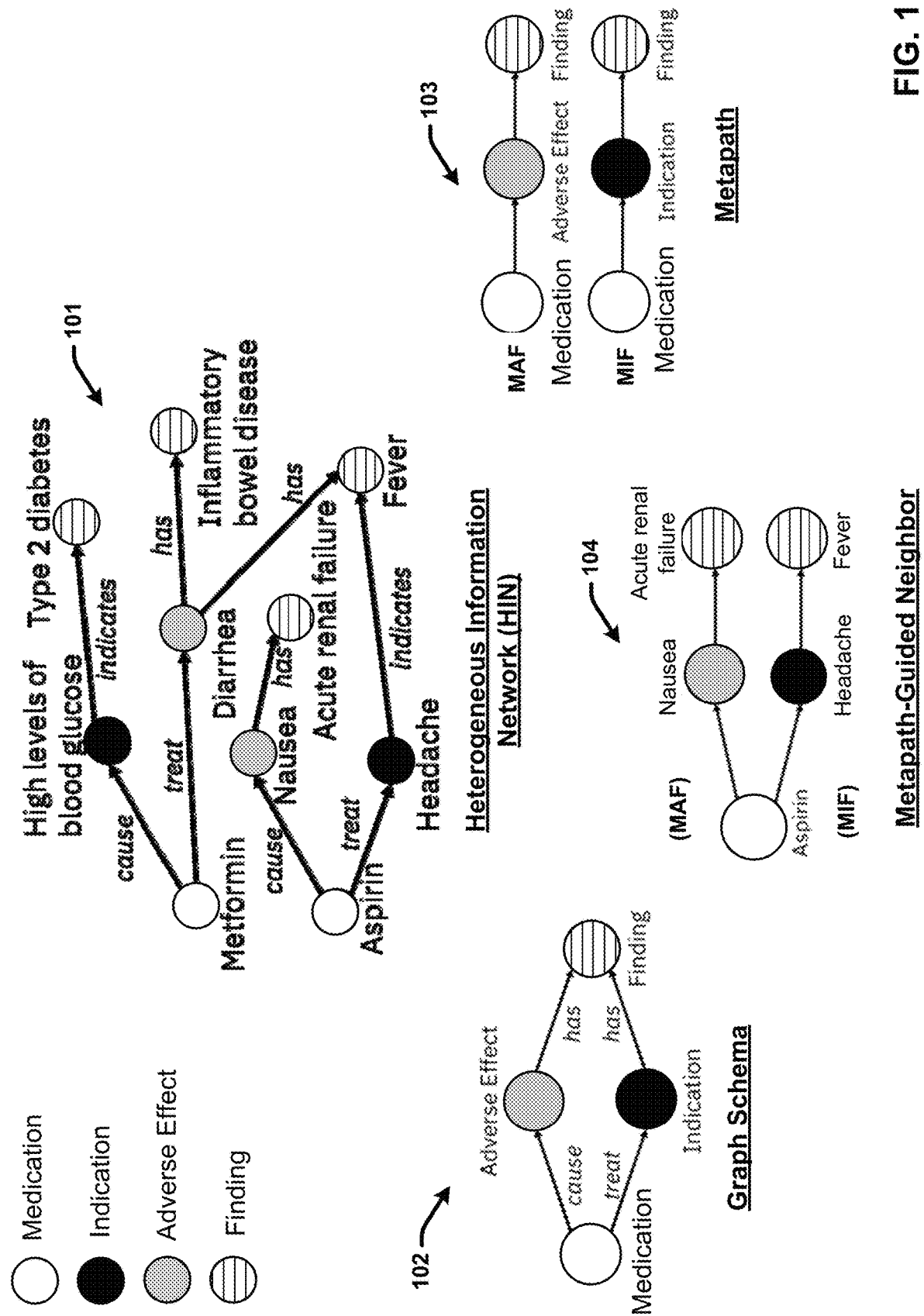
FIG. 1 illustrates an example heterogeneous information network (HIN) and its components in accordance with one or more embodiments.

The following detailed description is merely illustrative and is not intended to limit embodiments and/or application or uses of embodiments. Furthermore, there is no intention to be bound by any expressed or implied information presented in the preceding Technical Field or Summary sections, or in the Detailed Description section.

The disclosed subject matter is directed to systems, computer-implemented methods, and/or computer program products that facilitate entity disambiguation using one or more heterogeneous GNNs, aiming to support the editorial entity in the KG curation and maintenance process while ensuring the entities in text snippets are consistent with ones in an existing KG. To facilitate this end, the disclosed entity disambiguation techniques model the KG as a heterogeneous information network (HIN). Modeling the KG as an HIN provides for flexibly exploiting its rich structural and semantic information. The disclosed entity disambiguation techniques then leverage both semantic and structural information from the KG and the text snippet, thereby greatly improving the effectiveness and robustness of the entity disambiguation method.

In one or more embodiments, the disclosed entity disambiguation techniques involve three pieces. The first piece involves modeling the text snippet comprising unstructured terms (e.g., a sentence or phrase), including an ambiguous or unknown term (e.g., an acronym), as a heterogeneous query graph. The heterogeneous query graph employs the same graph schema as the HIN used for the KG, wherein terms are referred to as entities. The graph schema of the HIN further defines different types of entities (e.g., thereby making it "heterogeneous") and the relationships between entities. In this regard, the heterogeneous query graph defines the terms in the text snippet as entities and further defines the semantic relationships between the entities, which better preserves the inherent structural information in the text snippet. This provides for harnessing the rich latent structural information available from the text snippet.

The second piece involves training a GNN to learn the representations of the entities in the KG. Concretely, the disclosed entity disambiguation GNN (referred to herein as ED-GNN) uses the metapath-based neighbors in the KG to aggregate rich neighbor information with an attention mechanism. The underlying intuition involves leveraging the semantic-aware metapaths to guide the ED-GNN to extract concise and relevant information by aggregating specific type of neighbors hop-by-hop. The ED-GNN further fuses latent vectors obtained from multiple metapaths into final node embeddings. By leveraging multiple metapaths, the ED-GNN can represent the rich graph-structured information provided by the KG in a low-dimensional vector space, allowing an efficient entity disambiguation.

The third piece involves employing the GNN to find (if available) one or more similar entities (e.g., terms) in the KG to the ambiguous or unknown term in the text snippet. In various embodiments, this involves deploying the ED-GNN in the form of a Siamese network to identify the most similar node embeddings from the KG and comparing the vector representations for the similar node embeddings.

Various embodiments of the disclosed entity disambiguation techniques are exemplified as applied to a medical domain KG. However, it should be appreciated that the disclosed entity disambiguation techniques are independent of particular domain. In this regard, the disclosed techniques can be applied to many different domains to perform entity disambiguation in a computationally efficient, cost effective, and automated manner. For example, the disclosed techniques can be used to perform entity disambiguation relative to a variety of different KBs that employ a defined ontology or schema for terms that can be modeled in a graph-structured representation of entities and their relationships.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

FIG. 1 illustrates an example HIN 101 and its components in accordance with one or more embodiments. HIN 101 provides an instance level example of a medical KG modeled as an HIN. The term heterogeneous in this context is used to refer to a KG that includes different types of entities, wherein the terms in the KG are referred to as entities. The HIN 101 provides a graph-structured representation of the entities and their relationships according to a defined ontology or graph schema 102. In this example, four different types of entities are defined, which include, a medication, an indication, an adverse effect, and a finding.

Each of the entities in the HIN 101 are modeled as nodes connected by lines or edges that represent the relationship between respective entities. Throughout the examples described herein, a medication type node is represented by a white circle, an indication node is represented by a black circle, an adverse effect is represented by a grey circle, and a finding is represented by a line-filled circle. In a HIN, the graph schema 102 is used to describe the meta structure of a network, which includes the node types and their interaction relations. In this example, the edge types can include either "cause," "treat," or "has."

A metapath 103 refer to the path defined by the graph schema 102 between connected nodes. In this example, the graph schema 102 defines two metapath which include a "medication-adverse effect-finding" metapath, referred to herein as "MAF," and a "medication-indication-finding" metapath, referred to herein as "MIF." In this regard, the MAF metapath indicates that according to the graph schema 102, medications can have adverse effects and these adverse effects can be described as findings. For example, in HIN 101, a MAF metapath extends from the aspirin node that indicates aspirin can cause the adverse effect of nausea which has an indication of acute renal failure. The MIF metapath represents that medications can treat indications, which can be described as findings. For example, in HIN 101, an MIF metapath also extends from the aspirin node that indicates aspirin can treat the indication of a headache which has a finding of a fever.

A metapath-guided neighbor 104 refers to node connected to another node along a metapath. In accordance with example HIN 101, the aspirin node has two metapath-guided neighbors, nausea and headache, each of which belonging to different metapaths. In addition, the node for acute renal failure is a metapath-guided neighbor of the node nausea.

FIG. 2 presents a table 200 summarizing the notations used herein. Various embodiments of the disclosed entity disambiguation techniques are described with the assumption of the following definitions and notations presented in table 200.

Definition 1. In one or more embodiments, an HIN (e.g., HIN 101) can be defined as a network as a network $\mathcal{H} = (\mathcal{V}, \varepsilon)$ associated with a node type mapping function $\phi: \mathcal{V} \mapsto$ $\mathcal{T}$ and an edge type mapping function $\psi: \varepsilon \mapsto \mathcal{R}$, wherein $\mathcal{T}$ and $\mathcal{R}$ denote the sets of node types and edge types, respectively.

Definition 2. In one or more embodiments, a metapath P (e.g., metapath MAF and metapath MIF) is a path defined on the network schema denoted in the form of $$T_1 \xrightarrow{R_1} T_2 \xrightarrow{R_2} \cdots \xrightarrow{R_m} T_{m+1},$$

where T and R if are node types and edge types, respectively.

Definition 3. In one or more embodiments, a metapath-guided neighbor can be defined as, given a metapath P and a node v in a HIN $\mathcal{H}$, the metapath-based neighbors of v, denoted $\mathcal{N}_v^P$, are the nodes that are connected with v via the metapath P.

Definition 4. In one or more embodiments, a heterogeneous network embedding can be defined as, given a HIN $\mathcal{H}$, with node attribute matrices $A_{T_i} \in \mathbb{R}^{|V_{T_i}| \times d_{T_i}}$ for node types $T_i \in \mathcal{T}$, a heterogeneous network embedding (or node embedding) is a d-dimensional node representation (e.g., an embedding) for all $v \in \mathcal{V}$ with $d \ll |\mathcal{V}|$, which captures the network structural and semantic information in $\mathcal{H}$. As used herein, a heterogeneous network embedding can be or correspond to a vector representation of node/entity (or term).

Figure 3:
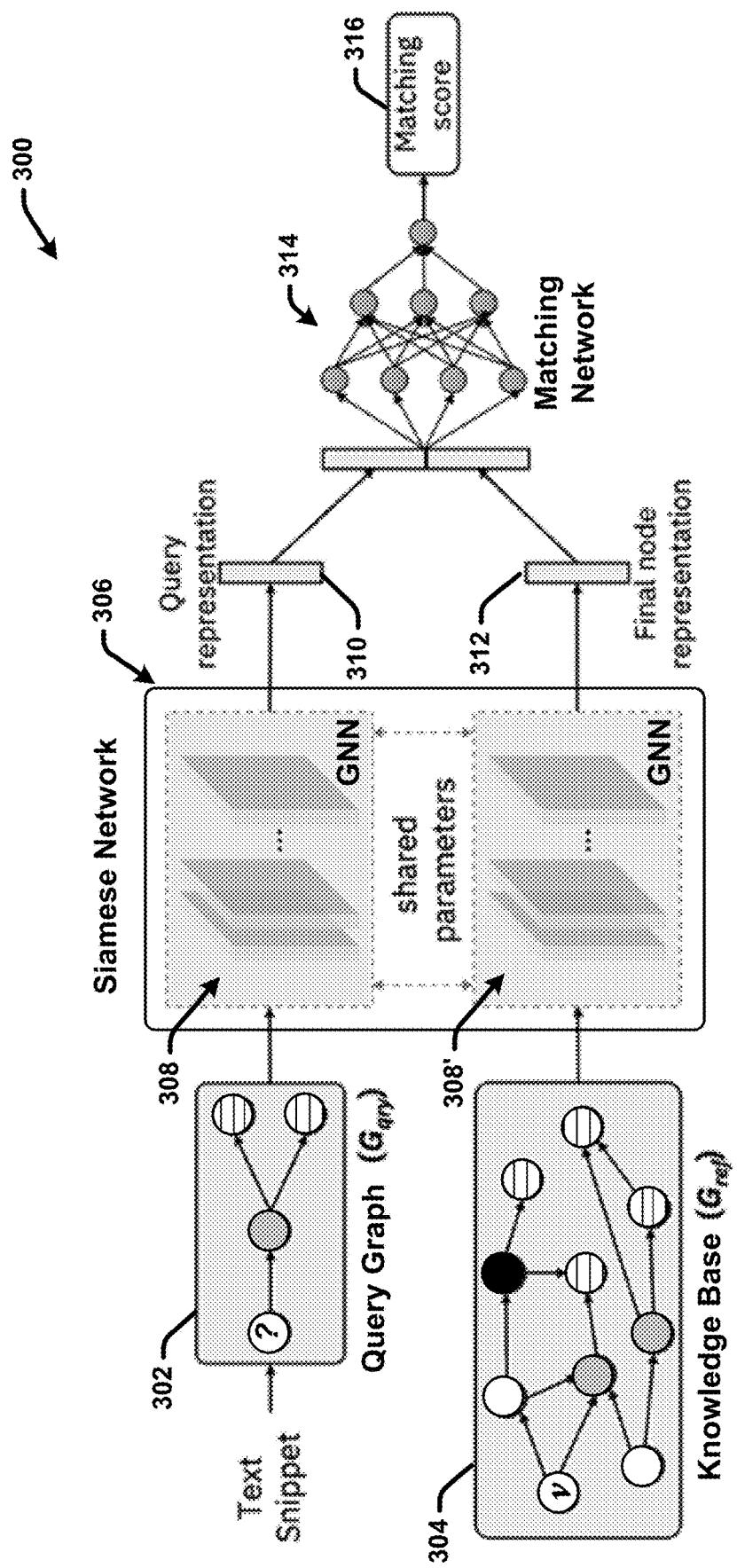
FIG. 3 presents a high-level diagram of an example process for performing entity disambiguation using a GNN in accordance with one or more embodiments.

FIG. 3 presents a high-level diagram of an example process 300 for performing entity disambiguation using a GNN in accordance with one or more embodiments. In accordance with process 300, a heterogeneous GNN 308 in the form of a Siamese network 306 receives and processes two inputs, a query graph 302 and a KG 304. With the disclosed entity disambiguation techniques, both the query graph 302 and the KG 304 are modeled as HINs in accordance with the same graph schema (e.g., graph schema 102), where nodes correspond to entities and edges correspond to relationships between those entities. In this regard, the query graph 302 represents an unstructured text snippet comprising an unknown or ambiguous term (e.g., represented by the question mark node) as an instance of a HIN. For example, the unstructured text snippet can include a sentence or phrase with at an unknown or ambiguous term. The query graph 302 models the terms as nodes (e.g., represented by different circles), defines the node types, and provides connections (e.g., edges) between the nodes based on their relationships to one another. Additional details regarding generation of a query graph for a text snippet are discussed in greater detail infra.

In accordance with process 300, a first instance of a heterogeneous GNN 308 can receive and process the query graph 302 and a second instance of the heterogeneous GNN 308 can receive and process the KG 304, wherein both the first and second instances of the heterogeneous GNN 308 are identical. The purpose of process 300 is to align the query graph 302 and with the KG 304 as closely as possible to find one or more corresponding node in the KG for the unknown/ambiguous node in the query graph 302. Expressed mathematically, the purpose of process 300 can be summarized as follows: Let $\mathcal{H}_R = (\mathcal{V}_R, \varepsilon_R)$ be a HIN representation (e.g., KG 304) of the knowledge base, and $\mathcal{H}_Q = (\mathcal{V}_Q, \varepsilon_Q)$ be HIN representation (e.g., query graph 302) of a given text snippet, and employ processes 300 to match the unknown entities in $\mathcal{H}_Q$ to their corresponding entities in To facilitate this end, the first instance of the heterogeneous GNN 308 maps the query graph into a low-dimensional vector space to generate a query node vector representation 310 of the node embedding of the unknown term in the query graph 302. In this regard, the query node vector representation 310 can be or correspond to a heterogeneous network embedding as defined in Definition 4. The second instance of the heterogeneous GNN 308' likewise learns/generates the low-dimensional reference node vector representations of the node embeddings for the nodes in the KG 304. In this regard, the reference node vector representation 312 can also be or correspond to a heterogeneous network embedding as defined in Definition 4. In the embodiment shown, a single reference node vector representation 312 is illustrated for the KG 304 for simplicity of illustration. However, in practice, the output of the second instance of the heterogeneous GNN 308 can include vector representations of all (or a targeted subset) nodes included in the KG 304, as illustrated in FIG. 4.

A matching network 314 can further compare the query node vector representation 310 with (each) of the reference node vector representations 312 using one or more similarity scoring algorithms/metrics to determine a matching score 316 for each query node vector representation/reference node vector representation pair. In some embodiments, the target node/term with the highest matching score can be returned as the match for the unknown term. In other embodiments, a ranked list of the top N percent scoring (e.g., wherein N can vary based on the application) target nodes/terms can be returned as potential candidates. Still in other embodiments, a thresholding analysis can be applied wherein the system returns a finding of "no match found" if the highest scoring target node/term has a matching score (or similarity score) below a defined threshold value.

Figure 4:
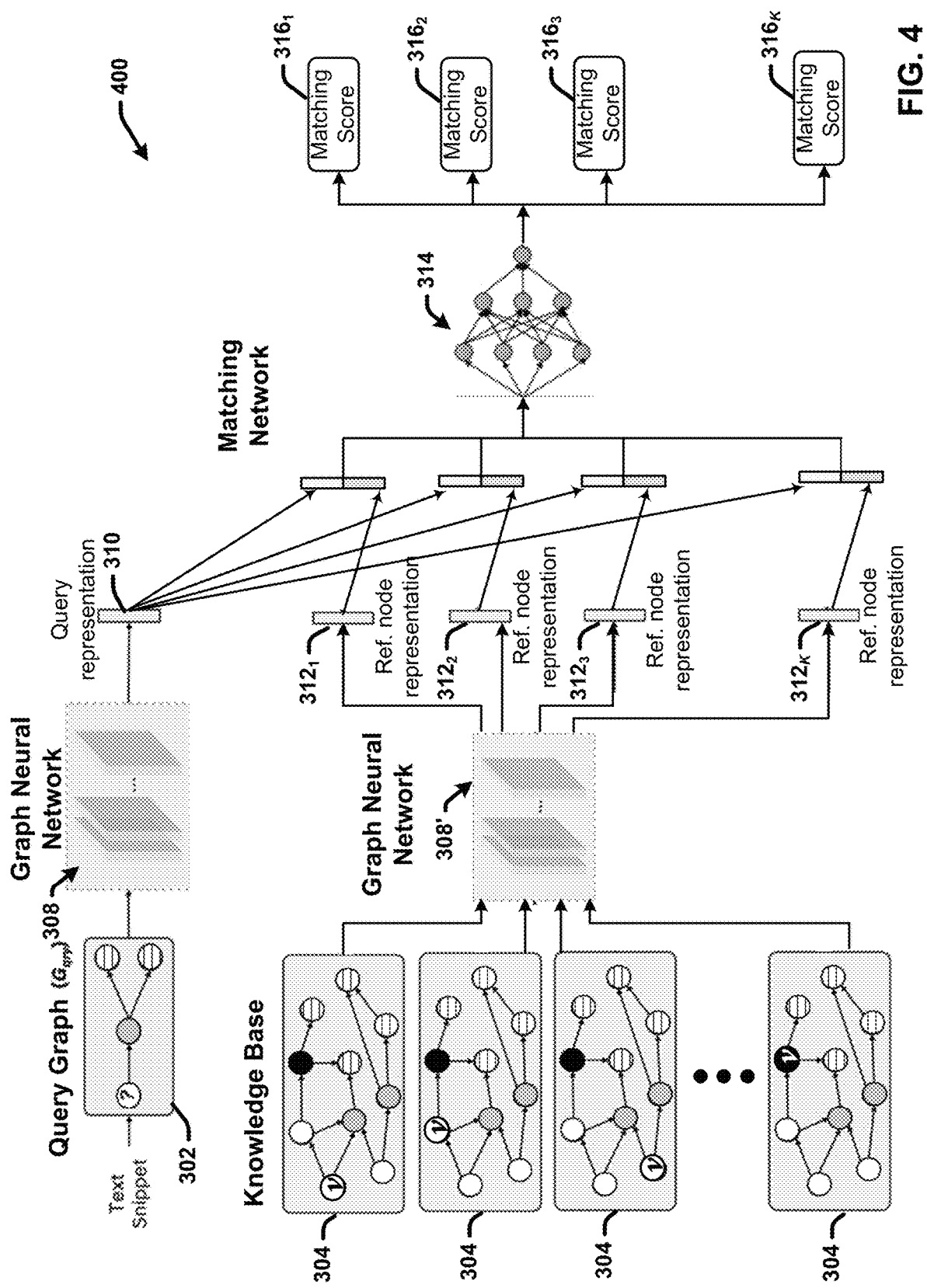
FIG. 4 presents a high-level diagram of another example process for performing entity disambiguation using a GNN in accordance with one or more embodiments.

FIG. 4 presents a high-level diagram of another example process 400 for performing entity disambiguation using a GNN in accordance with one or more embodiments. Repetitive description of like elements employed in respective embodiments is omitted for sake of brevity.

Process 400 illustrates the generation of a plurality of reference node vector representations for a plurality of different target nodes in the KG 304. In the embodiment shown, the different reference (Ref.) node vector representations are respectively identified as Ref. node vector representations $312_{1-K}$ The matching network 314 can further compare the query node vector representation 310 to each of the different reference node vector representations $312_{1-K}$ to generate separate matching scores $316_{1-K}$ for each pair.

In this regard, in some embodiments, the GNN 308' can be repeatedly applied to the KG 304 with the purpose of learning and generating the vector representation of a single reference node (v), which can vary on each repetition. For example, assuming the KG includes K number of nodes, the KG 304 can be processed K number of times to learn the vector representations for each of the nodes based on their respective graph embeddings. In some embodiments, the vector representations for each of the nodes in the KG 304 can be generated in an offline mode, prior to reception of any text snippet for evaluation.

Additionally, or alternatively, a select subset of target nodes can be targeted and processed to generate vector representations therefore simultaneously with processing of the query graph 302. The select subset of target nodes can be determined based on one or more parameters of the query graph 302. For example, the select subset of target nodes can include those nodes in the KG 304 having at least one guided-metapath neighbor corresponding to a same node in a query graph 302. In another example, the select subset of target nodes can include nodes of a specific type (e.g., medication, adverse effect, indication, finding, etc.). With these embodiments, as shown in FIG. 3 and process 300, parameters of the query graph 302 such as information identifying the entities, their types and their relationships, can be shared with the second instance of the heterogeneous GNN 308' to facilitate identifying target nodes and reducing the search space for which nodes vector representations are generated.

In this regard, the Siamese neural network 306 uses the same weights while working in tandem on two different input vectors to compute comparable output vectors. The Siamese network 306 can be used to make sure the embeddings computed for KG and query graph are comparable. For the training process, both GNN 308 and GNN 308' are trained on the KG 304 and the query graph 302 together with the same number of iterations (i.e., epochs). Note that during the training process, the embeddings (representations) of all nodes in KG are learned together in the GNN for the KG. In other words, there are only two GNNs used for training. The KG GNN is responsible for learning all nodes in KG, and the QG GNN is responsible for learning all entity mentions in the text snippet. The training process relies on training data (labeled pairs) to learn a model. For example, one labeled pair can be {ARF, acute renal failure}, or {kidney disease, renal failure}.

The disclosed systems then employ the learned model in the runtime querying process. Specifically, given a text snippet, the system creates a query graph for one ambiguous entity in the snippet. The system then feed this query graph into the model to retrieve the corresponding embedding of the ambiguous entity. Using this embedding, the system compares it with each node (embedding) in the KG and returns the most (or top-k) similar (cosine similarity) node(s) from the KG. These nodes are considered as the entities that the ambiguous mention refers to.

Figure 5:
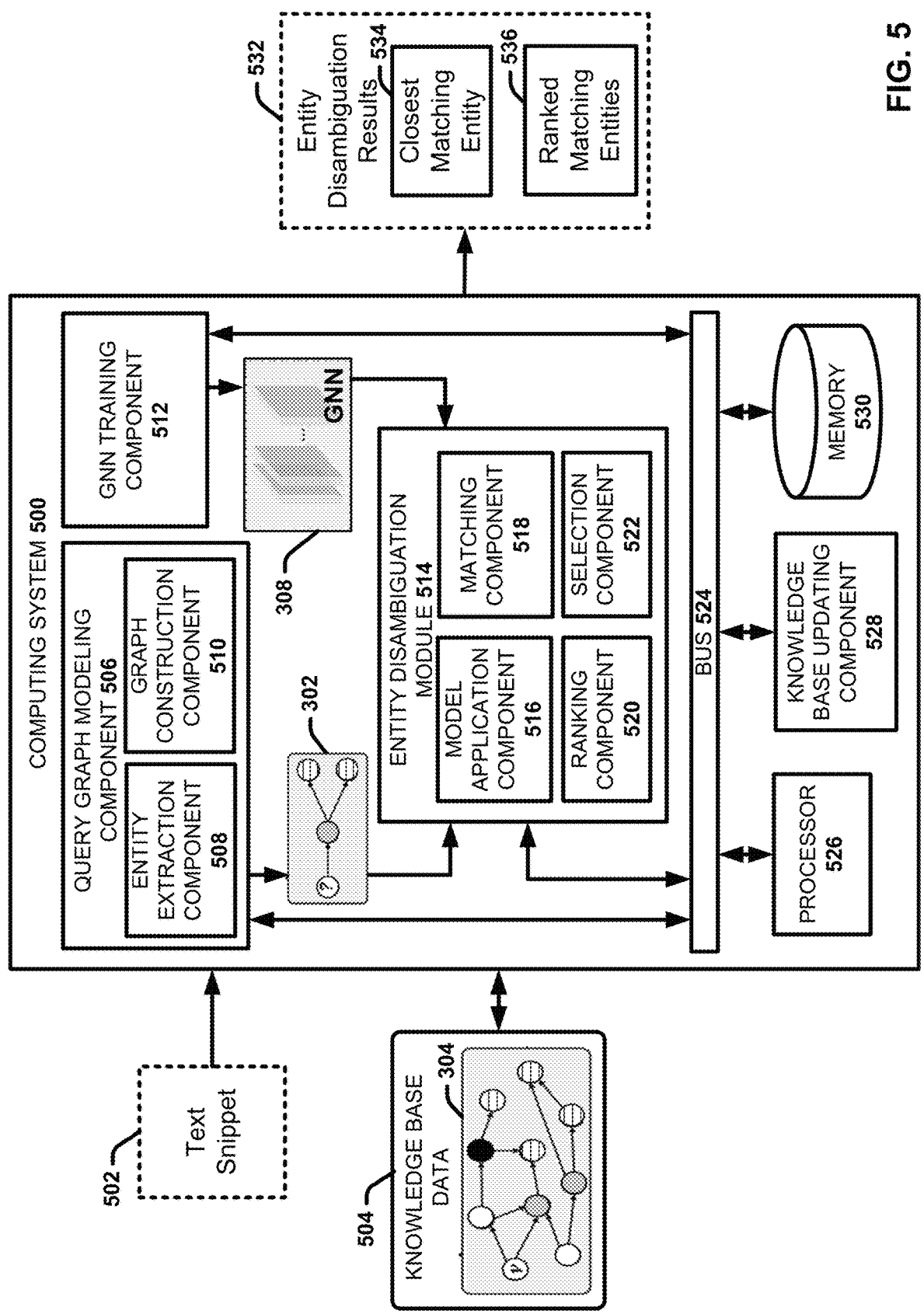
FIG. 5 illustrates a block diagram of an example computing system 500 for performing entity disambiguation using a GNN in accordance with one or more embodiments.

FIG. 5 illustrates a block diagram of an example computing system 500 for performing entity disambiguation using a GNN in accordance with one or more embodiments. Repetitive description of like elements employed in respective embodiments is omitted for sake of brevity.

Embodiments of systems described herein can include one or more machine-executable components embodied within one or more machines (e.g., embodied in one or more computer readable storage mediums associated with one or more machines). Such components, when executed by the one or more machines (e.g., processors, computers, computing devices, virtual machines, etc.) can cause the one or more machines to perform the operations described. For example, in the embodiment shown, computing system 500 includes query graph modeling component 506 (which include entity extraction component 508 and graph construction component 510), GNN training component 512, heterogeneous GNN 308, entity disambiguation module 514 (which includes model application component 516, matching component 518, ranking component 520 and selection component 522), and knowledge base updating component 528. All of the components and additional components described herein can respectively be or correspond to machine or computer executable components.

The computing system 500 can further include or be operatively coupled to at least one memory 530 and at least one processor 526. In various embodiments, the at least one memory 530 can store executable instructions (e.g., provided by the query graph modeling component 506, the GNN training component 512, the heterogeneous GNN 308, the entity disambiguation module 514 and the knowledge base updating component 528) that when executed by the at least one processor 526, facilitate performance of operations defined by the executable instructions. In some embodiments, the memory 530 can also store one or more of various data sources and/or structures employed by the computing system 500, including the knowledge base data 504, the query graph 302, and the information generated by the entity disambiguation module 514, represented in FIG. 5 as the entity disambiguation results 532. Examples of the processor 526 and memory 530, as well as other suitable computer or computing-based elements, can be found with reference to FIG. 12 with respect to processing unit 1216 and system memory 1214, and can be used in connection with implementing one or more of the systems or components shown and described in connection with FIG. 5 or other figures disclosed herein. The computing system 500 can further include a bus 524 that couples the respective elements of the computing system 500 to one another.

In some embodiments, the computing system 500 can comprise any type of component, machine, device, facility, apparatus, and/or instrument that comprises a processor and/or can be capable of effective and/or operative communication with a wired and/or wireless network. All such embodiments are envisioned. For example, the computing system 500 can be or include a server device, a computing device, a general-purpose computer, a special-purpose computer, a tablet computing device, a handheld device, a server class computing machine and/or database, a laptop computer, a notebook computer, a desktop computer, a cellular phone, a smart phone, an industrial and/or commercial device, a digital assistant, a multimedia Internet enabled phone, and/or another type of device.

The query graph modeling component 506 can receive a text snippet and generate a corresponding query graph $\mathcal{H}_Q$ (e.g., query graph 302) therefore in accordance with a defined graph schema of the associated KG (e.g., KG 304). In the embodiment shown, the KG 304 can be provided in accessible knowledge base data 504. The knowledge base data 504 can also include the graph schema (e.g., graph schema 102), and in some implementations, another representation of the information represented in the KG 304 (e.g., the knowledge base information in a script format, text format, etc.). To facilitate this, end the query graph modeling component 506 includes entity extraction component 508 and graph construction component 510. At a high level the entity extraction component 508 can extract the relevant entities from the text snippet 502 as the nodes for the query graph and assigns types to the entities. The graph construction component 510 further determines the relationships between the entities based on a defined graph schema for the KG 304. The graph construction component 510 can then generate the connections (e.g., the edges) between the nodes based on the relationships. The features and functionalities of the entity extraction component 508 and the graph construction component 510 are illustrated with reference to FIG. 6.

Figure 6:
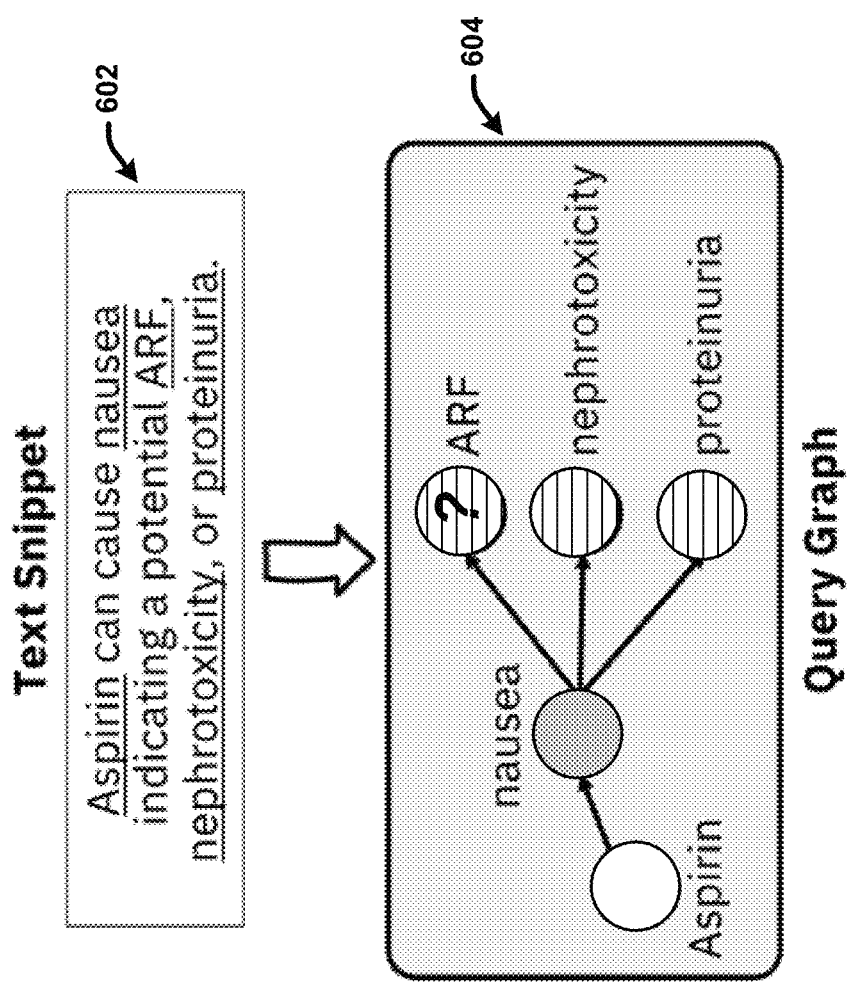
FIG. 6 illustrates modeling a text snippet as a query graph in accordance with one or more embodiments.

In this regard, FIG. 6 illustrates modeling a text snippet 602 as a query graph 604 in accordance with one or more embodiments. In various embodiments, text snippet 602 can correspond to text snippet 502 and the query graph 604 can correspond to query graph 302.

With reference to FIGS. 5 and 6, the first step in the query graph modeling process involves extracting entity mentions from the text snippet by the entity extraction component 508. The example text snippet 602 state states: "Aspirin can cause nausea indicating a potential ARF, nephrotoxicity, and proteinuria." In this example, the underlined words represent the extracted entity mentions from the text snippet 602 which constitute the nodes in the query graph 604 generated therefrom. In this regard, the entity extraction component 508 can identify the following terms as entity mentions of medical entities in the text snippet 602: "Aspirin," "nausea," "ARF," "nephrotoxicity" and "proteinuria." In various embodiments, the entity extraction component 508 can employ existing named entity recognition techniques for extracting the entity mentions from a text snippet. For example, the named entity mention extraction techniques can include employing a previously trained deep learning-based named entity recognition model or a similar type of model.

The entity extraction component 508 can further compare the extracted entity mentions with the entities in the KG 304 (e.g., $\mathcal{H}_R$) to determine or infer their respective types. For example, in one or more embodiments, the entity extraction component 508 can determine the extracted entity types using an inverted index of the entities in $\mathcal{H}_R$ to find the matching/corresponding entities and their types (e.g., for those extracted entities that are known). In various embodiments, the inverted index can be provided in the knowledge base data 504 and/or generated by the entity extraction component 508 based on the KG 304. The inverted index can include not only the exact matches of these entities, but also synonyms, acronyms, and abbreviations of the entities in $\mathcal{H}_R$.

Ideally, most of these entity mentions in a received text snippet 502 should have their matches in $\mathcal{H}_R$. However, the disclosed entity disambiguation techniques are intended to be used to determine corresponding nodes of unknown or ambiguous terms for which there is not a direct match in the KG 304 ($\mathcal{H}_R$) (e.g., including no matching corresponding synonym, acronym or abbreviation). In example text snippet 602, the unknown or ambiguous entity is "ARF."

For the matched entity mentions, the entity extraction component 508 can determine or infer their corresponding entity types based on the mapping and the network schema of the knowledge graph $\mathcal{H}_R$. For instance, with respect to the text snippet 602, the entity extraction component 508 can identify "aspirin" as an instance of medication, "nausea" as an instance of adverse effect, and "nephrotoxicity" as well as "proteinuria" as instances of a finding in $\mathcal{H}_R$. These identified entities can help the entity extraction component 508 disambiguate the remaining entity mention "ARF," for which a match is not found (as indicated by the question mark for is node in the query graph 604).

The graph construction component 510 can further construct the query graph 604 using the extracted entity mentions as nodes as guided by their determined node types and relationships in the graph schema. In this regard, it has been shown that textual information is not adequate to disambiguate all entity mentions in a given text snippet. Thus, the graph construction component 510 can exploit more latent information that is available, which comes from the graph structuring of the snippet. Representing the text snippet as a graph instead of a sequence of words can preserve the inherent structural information in the text snippet.

To construct the query graph 302 (e.g., $\mathcal{H}_Q$), the graph construction component 510 can represent the identified entity mentions as nodes $V_Q$ in $\mathcal{H}_Q$. The graph construction component 510 can further leverage the network schema of $\mathcal{H}_R$ (e.g., KG 304) to infer the edges among these nodes, since the network schema captures the semantic relationships among these nodes in $\mathcal{H}_R$. Specifically, the graph construction component 510 can be configured to introduce an edge between a pair of nodes u' and v' (e.g., entity mentions) in the query graph $\mathcal{H}_Q$, if there exists an edge between two matching nodes u and v in $\mathcal{H}_R$, where u is the matching node of u', and v is the matching node of v' in $\mathcal{H}_R$. The graph connection construction component 510 can also determine or infer the type of the newly added edge from the corresponding edge in $\mathcal{H}_R$ as well. To continue with the example shown in FIG. 6, with reference to FIG. 6 and FIG. 1, the nodes "Aspirin" and "nausea" are connected by an edge of type "cause" in the HIS 101 corresponding to $\mathcal{H}_R$ as shown in FIG. 1. Hence the graph construction component 510 can make the edge connecting nodes u and v in $\mathcal{H}_Q$ the type "cause" as well. For those entity mentions that do not have their matches in $\mathcal{H}_R$, the graph construction component 510 can rely on entity types obtained using named entity recognition to find the corresponding node type in the graph schema $S_R$ of $\mathcal{H}_R$ and further identify the edges associated with the node type. These relevant edges lead to the connecting nodes and their node types in $S_R$. Subsequently, the graph construction component 510 can add each un-known entity mention to the query graph $\mathcal{H}_Q$, and add edges between the unknown entity and the existing entities if they belong to any one of the connecting node types. The overall query graph construction method is presented in Algorithm 1 shown in FIG. 7.

As an example, with reference to FIG. 6, the unknown entity mention "ARF" does not have a match found in $\mathcal{H}_R$. However, based on its entity type (e.g., a finding) detected by the named entity recognition model and the graph schema $S_R$, the graph construction component 510 can determine that "ARF" should connect to an instance of the "adverse effect" node type, which in this example is "nausea," as shown in query graph 604.

Figure 8:
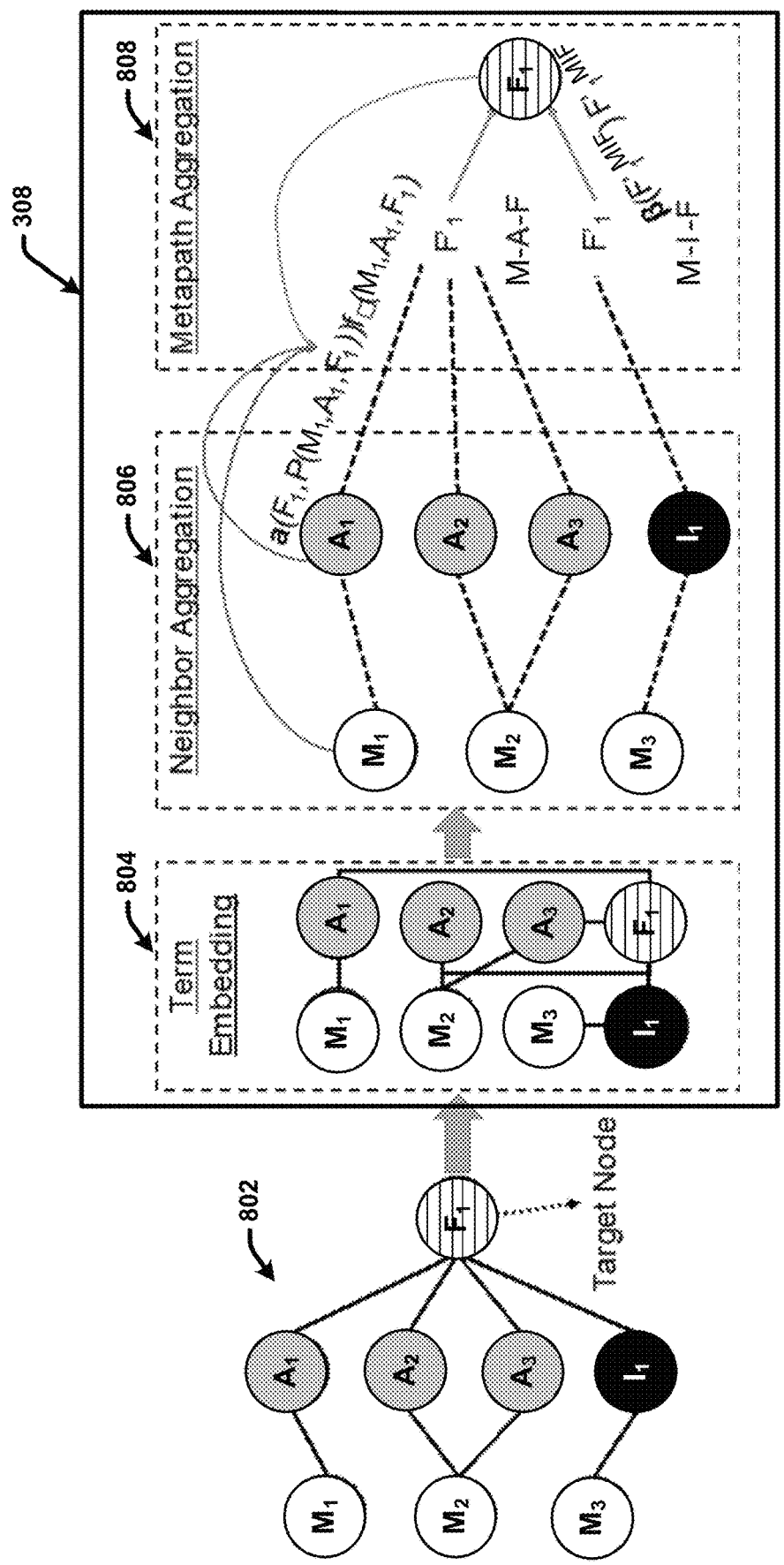
FIG. 8 provides a diagram of an example entity GNN in accordance with one or more embodiments.

FIG. 8 provides a diagram of an example implementation of GNN 308 in in accordance with one or more embodiments. Repetitive description of like elements employed in respective embodiments is omitted for sake of brevity.

Heterogeneous GNN 308 is a metapath-based graph neural network ED-GNN that can be used for entity disambiguation. Such a heterogeneous GNN enriches the representations of the targeted node types (e.g., medication, adverse effect, indication, finding, etc.) for entity disambiguation. As shown in FIG. 8, the overall framework of heterogeneous GNN 308 consists of three layers: a term embedding layer 804, a neighbor aggregation layer 806, and a metapath aggregation layer. The input for heterogeneous GNN 308 includes an HIN graph 802 with an identified target node. The output of heterogeneous GNN 308 is a heterogeneous network embedding for the target node as defined in Definition 4, that is, a low-dimensional vector representation for the target node that accounts for its attributes (e.g., node type) as well as its metapaths and metapath-guided neighbors.

FIG. 8 demonstrates an implementation of heterogeneous GNN 308 wherein the input comprises an HIN graph 802 that follows graph schema 102, wherein the M nodes (e.g., $M_1$, $M_2$ and $M_3$) correspond to medication node types, the A nodes (e.g., $A_1$, $A_2$ and $A_3$) correspond to adverse effect node type, the I node ($I_1$) correspond to an indication node type, and the F ($F_1$) node corresponds to a finding node type. In this example, the target node is $F_1$. As previously described, the graph schema 102 defines two metapaths with these node types, MAF and MIF. In this example, the HIN graph 802 can correspond to a query graph with an unknown term as the target node (e.g., query graph 302 or the like), or a portion of the KG 304 pertaining to a selected target node.

In this regard, in one or more embodiments, reference vector representations can be generated for each (or in some implementations one or more) node in the KG 304 by extracting a sub-graph for each target node and applying the sub-graph as input to the heterogeneous GNN 308. The sub-graph can include all metapaths for the target node as included in the KG 304. For example, with reference to FIG. 1 and HIN 101, assume in one example the target node is "fever." The sub-graph for this target node includes one MAF metapath ("metformin, diarrhea, fever") and one MIF metapath ("aspirin, headache, fever"). Although "fever" is connected to the node "inflammatory bowel disease" indirectly via the "diarrhea" node, the sub-graph for the fever node would not include the inflammatory bowel disease node because it is not a metapath-guided neighbor of the fever node, as "finding, adverse effect, finding" is not a defined metapath.

With reference back to FIG. 8, starting with HIN graph 802 as input, initially, the term embedding layer 804 employs one or more pre-trained word embedding models to generate initial term embeddings of the entities/nodes in the HIN graph 802. The neighbor aggregation layer 806 then aggregates the information of the metapath-guided neighbors of the target node $F_1$ to learn the embeddings of each metapath instance associated with the target node. The neighbor aggregation layer can employ a weighted sum of the metapath-based neighbors to determine vector representations of respective metapaths of the target node. Finally, the metapath aggregation layer 808 combines all metapath vector representations of the target node $F_1$ based on a weighted sum of the different metapaths to generate a final vector representation of the target node $F_1$. FIG. 8 demonstrates the embedding generation of a single target node $F_1$. In this regard, the process demonstrated in FIG. 8 can be applied to a query graph (e.g., query graph 302, query graph 604, and the like) to generate a vector representation for an unknown term (e.g., "ARF") as the target node. The processes demonstrated in FIG. 8 can also be separately applied to sub-graphs for each node in the KG 304 to generate reference vector representations for each node (e.g., as illustrated in FIG. 4).

With reference again to FIG. 5, in various embodiments the GNN training component 512 can train the heterogeneous GNN 308 to generate the low-dimensional vector representation of a target node. In some embodiments, the training process can employ the KG 304 (or a portion thereof), and result in generation of reference vectors for each of the target nodes in the KG 304. In this regard, the GNN training component 512 can train the heterogeneous GNN 308 on the KG 304 (e.g., using supervised, unsupervised and/or semi-supervised machine learning methods) and thereafter, the entity disambiguation module 514 can employ the heterogeneous GNN 308 once trained to generate low-dimensional vector representations of text snippets (e.g., text snippet 502) modeled as query graphs (e.g., query graph 302). Additional details of the respective layers of the heterogeneous GNN 308 are now described with reference to FIG. 8 from the perspective of training the heterogeneous GNN 308 on the KG 304 (e.g., $\mathcal{H}_R$).

With reference again to FIG. 8, and the term embedding layer 804, in principle, each node in a HIN can be associated with different types of attributes, capturing the semantic information of the graph. For example, every node may be associated with a set of attributes, which describe the node (e.g., name, synonyms, definition). In some embodiments, the GNN training component 512 can use only the name attribute for a node, wherein the name attribute can include one or more words. Nodes consisting of two or more words (e.g., "exfoliative dermatitis") are referred to herein as composite term. However, the heterogeneous GNN 308 can easily be extended to capture multiple types of node attributes, with different dimensions of feature vectors. Namely, a type-specific linear transformation can be used to project different types of node attributes into the same latent vector space.

In one or more embodiments, the GNN training component 512 can consider all attributes (e.g., terms) to be constituted of domain-specific words. With these embodiments, the term embedding layer 804 can leverage state-of-the-art deep learning-based word embedding models to determine word embeddings for the respective nodes in the input HIN graph 802. For example, in some embodiments, the term embedding layer 804 can employ a Bidirectional Encoder Representations from Transformers (BERT) model or an Embeddings from Language Model (ELMo) to produce high-quality word embeddings for the nodes/entities in the HIN graph 802. In accordance with example implementations applied to the medical domain, the term embedding layer 804 can employ a pre-trained medical language model trained on clinical literature and clinical notes to generate the term embeddings. Additionally, or alternatively, the term embedding layer 804 can employ a neural architecture to train a model in an unsupervised manner to generate the word embeddings.

After the word embeddings are determined for each node/entity, the term embedding layer can then aggregate the word embeddings to generate the term embeddings. In this regard, as used herein, a "word embedding" refers to the embedding of a word and a "term embedding" refers to the embedding of a term comprising of one or more word. For example, a term "acute renal failure" has three words. The term embedding layer 804 first get the word embedding of each word "acute," "renal," and "failure" in this term. The term embedding layer 804 then averages these three word embeddings to generate the term embedding. In some embodiments, the term embedding layer 804 can employ the Smooth Inverse Frequency (SIF) sentence embedding model the word embedding aggregation, which performs a weighted average of the constituent word embeddings. In accordance with the SIF model, the weight f(w) for the embedding of a word w is expressed as f(w)=a/(a+p(w)) where a is a hyperparameter and p(w) is the normalized unigram frequency of w in the text corpus. After applying this aggregation, the resulting term embedding can be used as the initial state $h_v^{attr}$ of each node.

The neighbor aggregation layer 806 then then aggregates the information of the metapath-guided neighbors of the target node $F_1$ to determine the embeddings of each metapath instance associated with the target node. In this regard, the overall function of the neighbor aggregation layer 806 can be summarized as learning the relative importance of the different metapath-guided neighbors to $F_1$ in each of the different metapaths to generate aggregated vector representations of the different metapaths. For example, in accordance with graph schema 102 and example HIN graph 802, the HIN graph 803 has three instances of an MAF metapath ($M_1A_1F_1$, $M_2A_2F_1$, and $M_2A_3F_1$) and one instance of a MIF metapath ($M_3I_1F_1$). The neighbor aggregation layer can employ a weighted sum of these neighbors ($M_1A_1F_1$, $M_2A_2F_1$, and $M_2A_3F_1$) to learn the representations of each metapath to arrive a single vector representation for an MAF metapath (instead of three) and a single vector representation for an MIF metapath. In this example, only one MIF metapath exists so neighbor aggregation for MIF is not needed.

Expressed mathematically, given a metapath $P_r$, the neighbor aggregation layer 806 learns the structural and semantic information embedded in the target node and the metapath-based neighbors by encoding the metapath instances of $P_r$. To obtain the embedding of the target node $F_1$ based on the instances of a metapath $P_r$=MAF, the neighbor aggregation layer 806 defines $P_r(v, u)$ as a metapath instance of $P_r$ connecting the target node v (e.g., $F_1$) and the source node u (e.g., $M_1$). The neighbor aggregation layer 806 first uses the linear encoder, an extension to the mean encoder, to aggregate the node vectors along the metapath instance (e.g., $M_1A_1F_1$) into a single vector in accordance with Equation 1, wherein $W_p$ is the parametric weight matrix.

$$h_{P_r(v,u)} = W_P \cdot \text{MEAN}(\{h_i^{attr}, \forall i \in P_r(v,u)\}) \qquad \text{Equation 1.}$$

After encoding the metapath instances into vector representations, the neighbor aggregation layer 806 can employ a graph attention mechanism to weighted sum the metapath instances of $P_r$ with respect to the target node $F_1$. The intuition is to learn the importance of different neighbors of $F_1$. Note that the importance of a pair of nodes is asymmetric. This way the neighbor aggregation layer 806 can preserve the asymmetry property of the heterogeneous graph. The neighbor aggregation layer 806 can model this by learning a normalized importance weight av,uPr for each metapath instance using Equation 2 below.

$$\alpha_{v,u}^{P_r} = \frac{\exp(\sigma(a^\top [h_v^{attr} \| h_{P_r(v,u)}]))}{\sum_{s \in N_v^{P_r}} \exp(\sigma(a^\top [h_v^{attr} \| h_{P_r(v,s)}]))}, \qquad \text{Equation 2}$$

where σ is an activation function, a is a parameterized attention vector for metapath $P_r$, and ∥ denotes the concatenation. The neighbor aggregation layer 806 can obtain av,uPr for all metapath-based neighbors (e.g., $M_1$, $M_2$, and $M_3$) of $F_1$ in FIG. 8. The neighbor aggregation layer 806 can then use them to compute the representations of the metapath instances (e.g., $M_1A_1F_1$, $M_2A_2F_1$, and $M_2A_3F_1$) related to $F_1$ using Equation 3.

$$h_v^{P_r} = \|_{k=1}^K \sigma\left(\sum_{u \in N_v^P} [\alpha_{v,u}^{P_r}] h_{P_r(v,u)}\right), \qquad \text{Equation 3}$$

where $[\alpha_{v,u}^{P_r}]$ denotes the normalized importance of metapath instance to node v at the kth attention head. Here the attention mechanism is extended to multiple heads in order to stabilize the learning process and to reduce the high variance introduced by the heterogeneous graphs.

In summary, given a set of metapath $\mathcal{P}_R = \{P_1, P_2, \ldots, P_r\}$ in which the target node type $T \in \mathcal{T}$ and all initial feature vectors $h_v^{attr}$, for every $v \in \mathcal{V}_R$, the neighbor aggregation layer 806 generates $|\mathcal{T}_R|$ metapath-based vector representations of the target nodes $v \in \mathcal{V}_T$, denoted as $\{h_v^{P_1}, h_v^{P_2}, \ldots, h_v^{P_r}\}$.

Finally, the metapath aggregation layer 808 combines the metapath embeddings or vector representations generated by the neighbor aggregation layer 806 as the final vector representation of the target node $F_1$ (e.g., combines the aggregated vector representation for MAF with the vector representation for MIF in this example). Generally, each node $v \in V_R$ contains rich semantic information and the embeddings from the neighbor aggregation can only respect nodes from one aspect. To learn a more comprehensive node embedding, the metapath aggregation layer 808 fuses different neighbor aggregations from different metapaths using the attention mechanism to assign different weights to different metapaths. Similar to Equation 2, this can be modeled by learning an importance weight $\beta_v^{P_r}$ for each metapath $P_r$ to the target node v in accordance with Equation 4.

$$\beta_v^{P_r} = \frac{\exp(\sigma(\beta^\top h_v^{P_r}))}{\sum_{P_s \in \mathcal{P}_R} \exp(\sigma(\beta^\top h_v^{P_s}))}, \quad \text{Equation 4}$$

where $\sigma$ is an activation function, and $\beta$ is an attention vector for neighbor aggregates that indicates the relative importance of metapath $P_r$ to the target node type T. In FIG. 8, target node $F_1$ has two vector representations $h_v^{P_1}$ and $h_v^{P_2}$ which represent the neighbor aggregations based on DAF and DIF, respectively. Once $\beta_v^{P_r}$ is computed for each $P_r$ associated to the targeted node type, the metapath aggregation layer can employ a weighted sum all the metapath-based node vectors of v to produce the final vector representation $h_v$ of v using Equation 5.

$$h_v = \sum_{P_r \in \mathcal{P}_R} \beta_v^{P_r} h_v^{P_r}. \quad \text{Equation 5}$$

With reference again to FIG. 5, in one or more embodiments, the GNN training component 512 can apply the heterogeneous GNN 308 hop-by-hop to each node in the KG 304 to obtain reference node vector representations for each of the nodes, which can then be used for different downstream tasks, including entity disambiguation. In various embodiments, the reference node vector representations can be added to the knowledge base data 504.

In one or more embodiments, the entity disambiguation module 514 can employ the reference node vector representations to perform entity disambiguation for an unknown term included in a text snippet 502. To facilitate this end, the entity disambiguation module 514 can include model application component 516, matching component 518, ranking component 520 and selection component 522.

The model application component 516 can apply the heterogeneous GNN 308 trained on the KG 304 to the query graph 302 generated for the text snippet 502 to generate a vector representation for the unknown term in the query graph 302 using the techniques described with reference to FIG. 8. The resulting vector representation corresponds to a heterogeneous network embedding for the unknown term (e.g., in accordance with Definition 4).

The matching component 518 can further compare the vector representation for the unknown term to the respective reference node vector representations to find a corresponding or matching term for the unknown term in the KG 304. In this regard, the matching component 518 can employ one or more similarity evaluation metrics to score the degree of similarity between the unknown term vector representation and the respective reference node vector representations. For example, in some embodiments, the matching component 518 can employ a neural network model (e.g., matching network 314) to compare node pairs based on their corresponding vector representations, wherein a node pair consists of one node representing the unknown entity in the text snippet 502 and one node representing a node in the KG 304. In some embodiments, the matching component 518 can optimize the matching model weights by minimizing the following loss function through negative sampling:

$$\mathcal{L} = -\sum_{(u,v) \in \Omega} \log(\sigma(h_u^\top h_v)) - \sum_{(u,v) \in \Omega^-} \log(\sigma(h_u^\top h_{v'})), . \quad \text{Equation 6}$$

where $\sigma(\bullet)$ is the sigmoid function, $\Omega$ is the set of observed (positive) node pairs, and $\Omega^-$ is the set of negative node pairs sampled from all unobserved node pairs.

In some embodiments, the ranking component 520 can further rank the reference nodes (corresponding to terms) based on their similarity scores or matching scores (e.g., from highest to lowest). In some implementations, the selection component 522 can select the highest-ranking reference node/term as a match for the unknown term in the text snippet. In some embodiments, the knowledge base updating component 528 can further automatically update the knowledge base data 504 by adding the unknown term as a synonym (or acronym, abbreviation, etc.) the matching term. For example, with respect to example text snippet 602, assuming the matching component 518 determined the closest matching node for "ARF" in the KG 304 was "acute renal failure", the knowledge base updating component 528 can automatically update the knowledge base data 504 to include ARF as an acronym for acute renal failure.

Additionally, or alternatively, the selection component 522 can select the top N percent highest scoring reference nodes as candidate matches for the unknown term. Still in other embodiments, the selection component 522 can be configured to employ a threshold requirement for the similarity scores for selecting a matching reference node for the unknown term. For example, in some embodiments, the selection component 522 can be configured to select a reference node as a match for the unknown term if its similarity score exceeds a minimum threshold score. With these embodiments the entity disambiguation module 514 can return result information indicating that no match was found for the unknown term if no reference node received a similarity score exceeding the threshold.

The entity disambiguation module 514 can further generate entity disambiguation results 532 comprising information regarding the results of the matching process. For example, the entity disambiguation results 532 can be presented to editorial entity (e.g., via a device display or another suitable output device) in the KG curation and maintenance process to facilitate ensuring the entities in text snippets are consistent with ones in the existing KG (e.g., KG 304). In the embodiment shown, the entity disambiguation results 532 can include information identifying the closest matching entity 534 to the unknown term and/or a ranked list of candidate matching entities 536.

Figure 9:
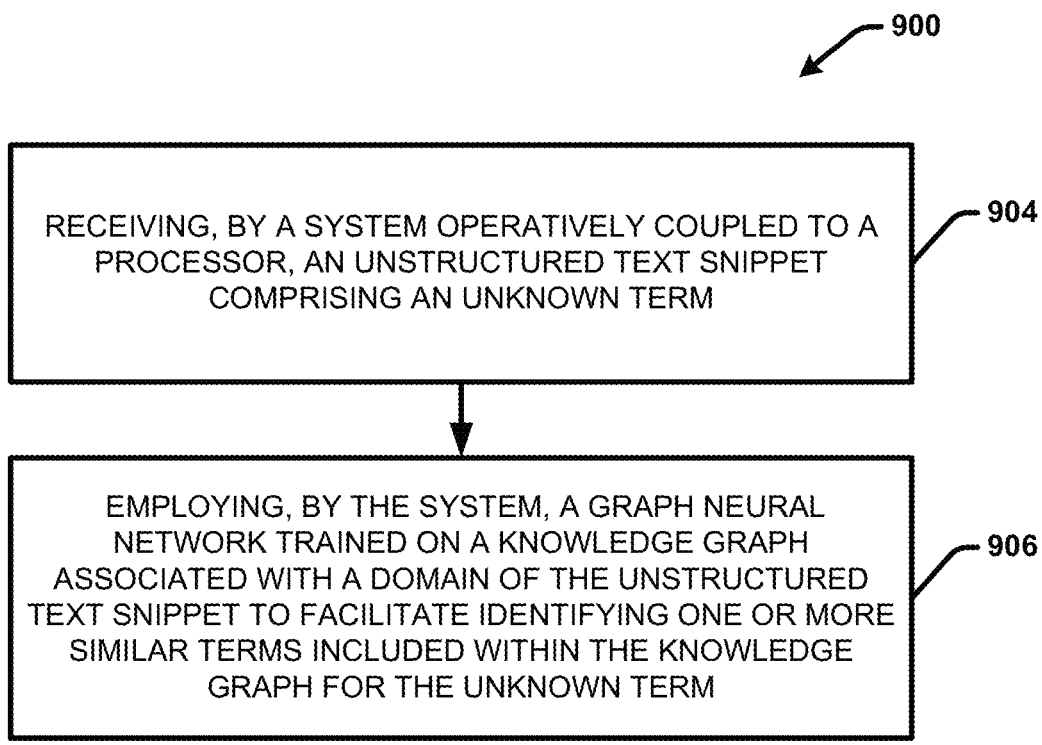
FIG. 9 illustrates a high-level flow diagram of an example, non-limiting computer-implemented method for performing entity disambiguation using a GNN in accordance with one or more embodiments.

FIG. 9 illustrates a high-level flow diagram of an example, non-limiting computer-implemented method 900 for performing entity disambiguation using a GNN in accordance with one or more embodiments. Repetitive description of like elements employed in respective embodiments are omitted for sake of brevity.

At 904, method 900 can comprise receiving, by a system operatively coupled to a processor (e.g., computing system 500), an unstructured text snippet (e.g., text snippet 502) comprising an unknown term. At 906, method 900 can comprise employing by the system (e.g., via the entity disambiguation module 514), a GNN (e.g., heterogeneous GNN 308, heterogeneous GNN 308, or the like) trained on a knowledge graph (e.g., HIN 101, KG 304 or the like) associated with a domain of the unstructured text snippet to facilitate identifying one or more similar terms included within the KG for the unknown term.

Figure 10:
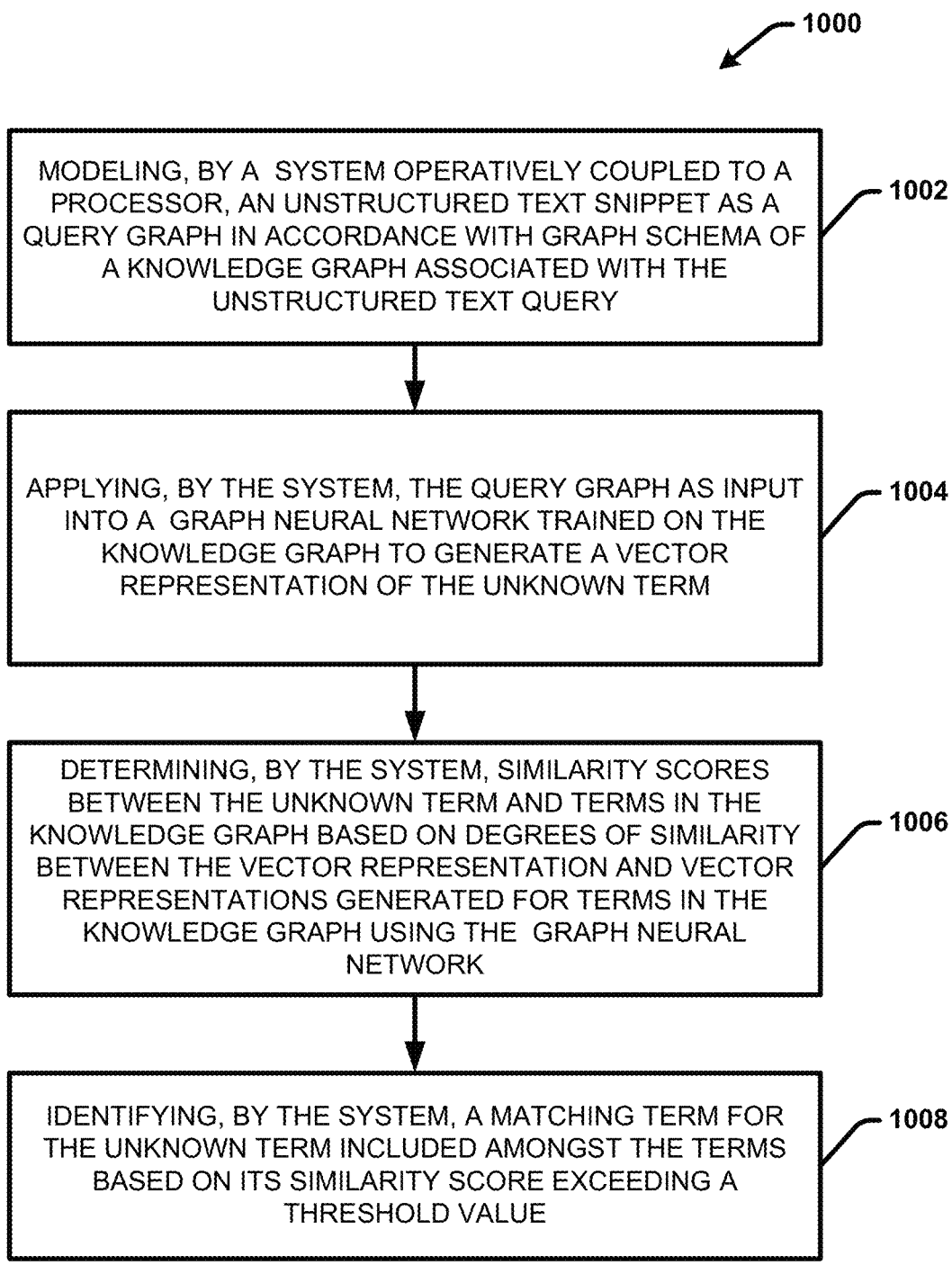
FIG. 10 illustrates a high-level flow diagram of another example, non-limiting computer-implemented method for performing entity disambiguation using a GNN in accordance with one or more embodiments.

FIG. 10 illustrates a high-level flow diagram of another example, non-limiting computer-implemented method 1000 for performing entity disambiguation using a GNN in accordance with one or more embodiments. Repetitive description of like elements employed in respective embodiments are omitted for sake of brevity.

At 1002, method 1000 can comprise modeling, by a system operatively coupled to a processor (e.g., computing system 500), an unstructured text snippet (e.g., text snippet 502) as a query graph (e.g., query graph 302) in accordance with graph schema (e.g., graph schema 102) of a KG (e.g., HIN 101, KG 304 or the like) associated with the unstructured text query. At 1004, method 1000 can comprise applying, by the system, the query graph as input to a GNN (e.g., heterogeneous GNN 308, or the like) trained on the KG graph to generate a vector representation for the unknown term. At 1006, method 1000 can comprise determining, by the system (e.g., using matching component 518), similarity scores between the unknown term and terms in the KG based on degrees of similarity between the vector representation (for the unknown term) and vector representations generated for terms in the KG using the heterogeneous GNN. At 1008, method 1000 can comprise identifying, by the system (e.g., using selection component 522), a matching term for the unknown term included amongst the terms based on its similarity score exceeding a threshold value.

Figure 11:
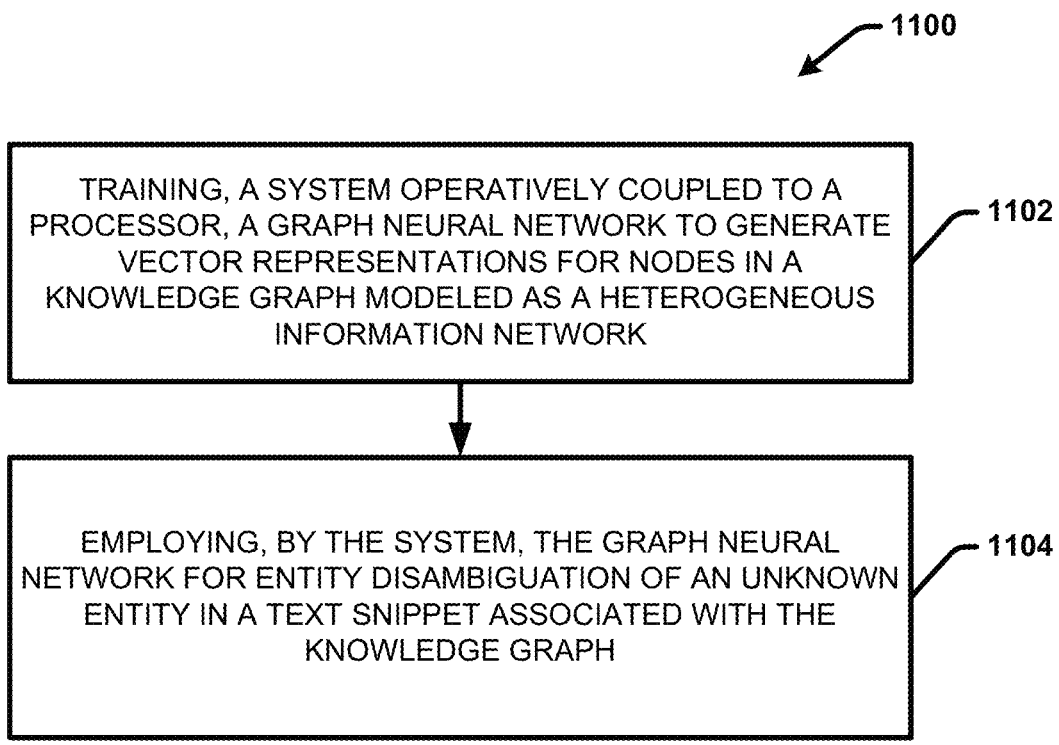
FIG. 11 illustrates a high-level flow diagram of another example, non-limiting computer-implemented method for performing entity disambiguation using a GNN in accordance with one or more embodiments.

FIG. 11 illustrates a high-level flow diagram of another example, non-limiting computer-implemented method 1100 for performing entity disambiguation using a GNN in accordance with one or more embodiments. Repetitive description of like elements employed in respective embodiments are omitted for sake of brevity.

At 1102, method 1100 can comprise training, by a system operatively coupled to a processor (e.g., computing system 500), a GNN (e.g., heterogeneous GNN 308, or the like) to generate vector representations for nodes in a KG modeled as a HIN. At 1104, method 1100 can comprise employing, by the system, the GNN for entity disambiguation of an unknown entity in a text snippet associated with the KG (e.g., via the entity disambiguation module 514).

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
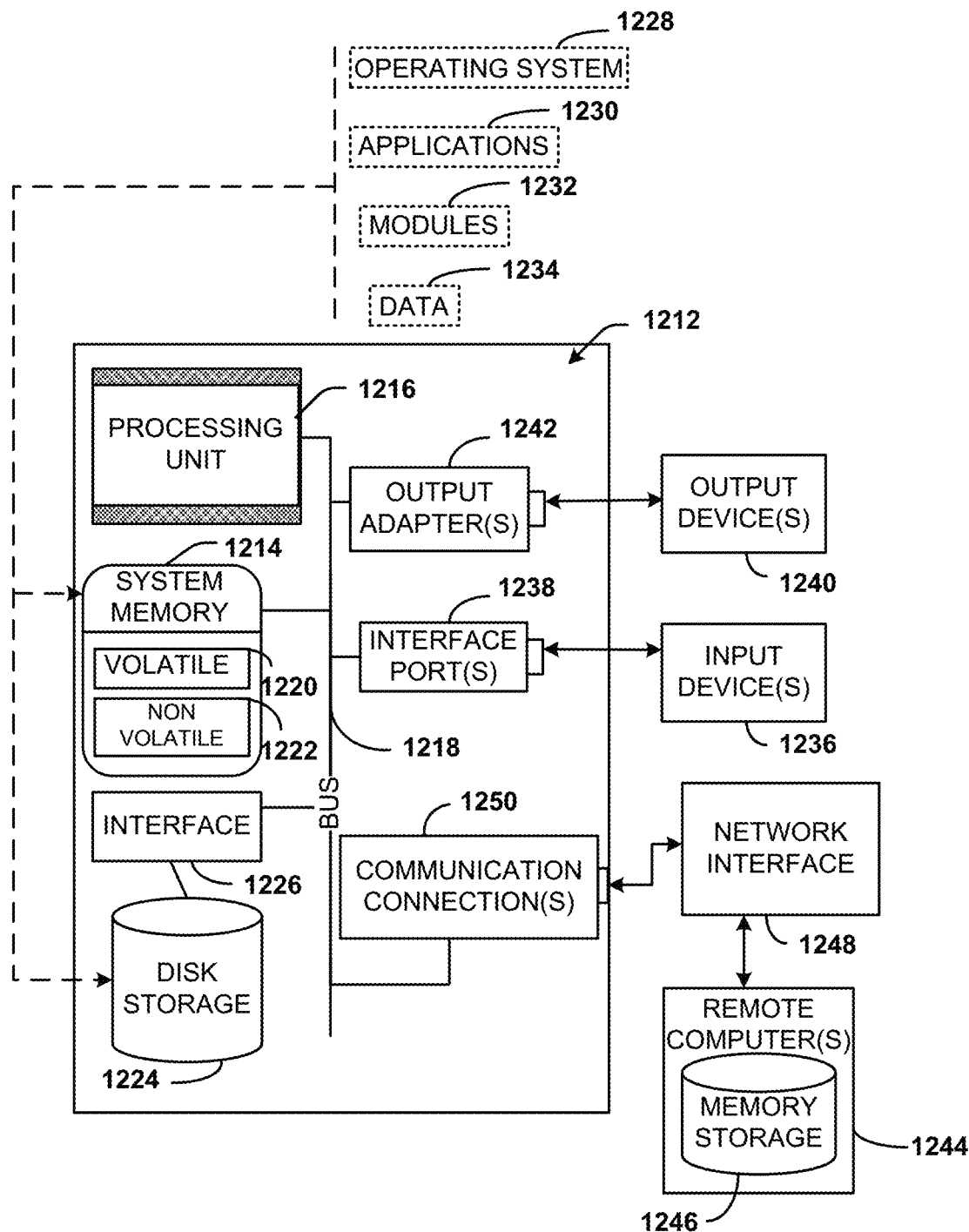
FIG. 12 illustrates a block diagram of an example, non-limiting operating environment in which one or more embodiments described herein can be facilitated.

FIG. 12 can provide a non-limiting context for the various aspects of the disclosed subject matter, intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1216, a system memory 1214, and a system bus 1218. The system bus 1218 couples system components including, but not limited to, the system memory 1216 to the processing unit 1214. The processing unit 1216 can be any of various available processors. Dual microprocessors and other multiprocessor architectures also can be employed as the processing unit 1216. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1214 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1216 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing machine learning and artificial intelligence to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a system operatively coupled to a processor, an unstructured text snippet comprising multiple terms including an unknown term;
modeling, by the system, the unstructured text snippet as a query graph based on respective types of the multiple terms and defined relationships between the respective types of the multiple terms as provided in defined graph schema, wherein the query graph comprises nodes for the terms, respectively, and edges connecting the nodes in accordance with the defined relationships;
processing, by the system, the query graph as input to a graph neural network trained on a knowledge graph associated with a domain of the unstructured text snippet to generate a final vector representation of a target node of the nodes, the target node corresponding to the unknown term, wherein the processing comprises:
determining multiple nodes that are metapath-guided neighbors to the target node in accordance with the defined graph schema, wherein the metapath-guided neighbors include multiple neighbors of a first type of the node and at least one neighbor of a second type of the respective types;
determining a first vector representation of the multiple neighbors of the first type using a weighted sum of the multiple nodes;
determining a second vector representation of the at least one neighbor of a second type; and combining the first vector representation and the second vector representation to generate the final vector representation for the target node; and identifying, by the system, one or more similar terms corresponding to the unknown term included in the knowledge graph based on a measure of similarity between respective reference vector representations of the one or more similar terms and the final vector representation exceeding a threshold measure of similarity.

2. The method of claim 1, further comprising:
processing, by the system, the knowledge graph as additional input into the graph neural network to generate the reference vector representations.

3. The method of claim 2, wherein the graph neural network comprises a Siamese network, wherein processing the query graph and the knowledge graph comprises:
simultaneously inputting, by the system, the query graph and the knowledge graph into different instances of the graph neural network; and
generating, by the system, the final vector representation and the reference vector representations based on shared parameters between the query graph and the knowledge graph.

4. The method of claim 1, further comprising:
rendering, by the system, result data identifying the one or more similar terms via an electronic output device.

5. The method of claim 1, wherein the graph neural network comprises a term embedding layer, a neighbor aggregation layer and a metapath aggregation layer.

6. The method of claim 1, wherein the graph neural network comprises a term embedding layer that employs a pre-trained word embedding model to generate term embeddings for the nodes.

7. A system comprising:
a memory that stores computer executable components;
a processor that executes the computer executable components stored in the memory to cause a method to be performed comprising:
training a graph neural network to generate reference vector representations for nodes in a knowledge graph modeled as a heterogeneous information network, wherein the graph neural network performs operations, for multiple nodes, respectively, the operations comprising:
determining metapath-guided neighbors for the node in accordance with defined graph schema of the heterogeneous information network, wherein the metapath-guided neighbors are divided into groups according to type as defined by the defined graph schema;
determining intermediate reference vector representations of the groups, respectively, using a weighted sum of the metapath-guided neighbors of each group; and
combining the intermediate reference vector representations to generate a reference vector representation for the node;
employing, by the system, the trained graph neural network for entity disambiguation of an unknown entity in a text snippet associated with the knowledge graph, wherein the employing comprises comparing a vector representation of the unknown entity to the reference vector representations of the graph neural network.

8. The system of claim 7, wherein the employing comprises identifying one or more similar entities corresponding to the unknown entity included in the knowledge graph based on a measure of similarity between respective reference vector representations of the one or more similar entities and the vector representation exceeding a threshold measure of similarity.

9. The system of claim 8, wherein the method to be performed further comprises applying further the knowledge graph as additional input into the trained graph neural network to generate the respective reference vector representations.

10. The system of claim 9, wherein the graph neural network comprises a Siamese network.

11. The system of claim 8, wherein the method to be performed further comprises rendering result data identifying the one or more similar entities via an electronic output device.

12. The system of claim 7, wherein the graph neural network comprises a term embedding layer, a neighbor aggregation layer and a metapath aggregation layer.

13. A computer program product for entity disambiguation, the computer program product comprising a computer readable storage medium having program instructions embodied therewith, the program instructions executable by a processor to cause the processor to perform operations comprising:
receiving an unstructured text snippet comprising a plurality of terms including an unknown term;
modelling the unstructured text snippet as a query graph based on respective types of the terms and defined relationships between the respective types of the terms as provided in defined graph schema, wherein the query graph comprises nodes for the terms and edges connecting the nodes in accordance with the defined relationships; and
processing the query graph as input to a graph neural network trained on a knowledge graph associated with a domain of the unstructured text snippet to generate a final vector representation of a target node of the nodes corresponding to the unknown term, wherein the processing comprises:
determining respective metapaths of the target node using respective ones of the nodes excluding the target node corresponding to metapath-guided neighbors in accordance with the defined graph schema;
determining vector representations of the respective metapaths using a weighted sum of the metapath-based neighbors respectively included in same types of the respective metapaths; and
combining the vector representations to generate the final vector representation for the target node.

14. The computer program product of claim 13, wherein the operations further comprise:
identifying one or more similar terms corresponding to the unknown term included in the knowledge graph based on a measure of similarity between respective reference vector representations of the one or more similar terms and the final vector representation exceeding a threshold measure of similarity.

15. A computer-implemented method comprising:
receiving, by a system operatively coupled to a processor, an unstructured text snippet comprising multiple terms including an unknown term;
modeling, by the system, the unstructured text snippet as a query graph based on respective types of the multiple terms and defined relationships between the respective types of the multiple terms as provided in a defined graph schema, wherein the query graph comprises nodes for the terms, respectively, and edges connecting the nodes in accordance with the defined relationships;

generating, by the system, a final vector representation of a target node of the nodes, the target node corresponding to the unknown term; and inputting, by the system, the query graph into a graph neural network trained on a knowledge graph that is organized according to the defined graph schema, wherein in response to the inputting the graph neural network:

selects a subset of nodes of the knowledge graph based on one or more parameters of the query graph;

determines vector representations, respectively, of the nodes of the subset; and outputs one or more identified terms of the knowledge graph, the one or more identified terms belonging to the selected subset and being identified based on a comparison of the final vector representation of the target node to the vector representations of the selected nodes of the subset.

16. The method of claim 15, wherein the generating is responsive to the inputting.

17. The method of claim 15, wherein the graph neural network comprises a term embedding layer that generates term embeddings of the nodes, a neighbor aggregation layer that learns metapath embeddings of the nodes, and a metapath aggregation layer that aggregates the metapath embeddings.

18. A computer-implemented method comprising:

receiving, by a system operatively coupled to a processor, an unstructured text snippet comprising multiple terms including an unknown term;

modeling, by the system, the unstructured text snippet as a query graph based on respective types of the multiple terms and defined relationships between the respective types of the multiple terms as provided in a defined graph schema, wherein the query graph comprises nodes for the terms, respectively, and edges connecting the nodes in accordance with the defined relationships;

generating, by the system, a final vector representation of a target node of the nodes, the target node corresponding to the unknown term; and inputting, by the system, the query graph into a graph neural network trained on a knowledge graph that is organized according to the defined graph schema, wherein in response to the inputting the graph neural network:

selects a subset of nodes of the knowledge graph, each of the nodes of the subset belonging to a first type of nodes according to the defined graph schema;

determines vector representations, respectively, of the nodes of the subset; and outputs one or more identified terms of the knowledge graph, the one or more identified terms belonging to the selected subset and being identified based on a comparison of the final vector representation of the target node to the vector representations of the selected nodes of the subset.

19. The method of claim 18, wherein the generating is responsive to the inputting.

20. The method of claim 18, further comprising:

rendering, by the system, result data identifying the one or more identified terms via an electronic output device.

21. The method of claim 15, wherein in response to the inputting, the graph neural network selects the subset of nodes based on comparing nodes of the query graph to nodes of the knowledge graph to identify a first subset of the nodes of the knowledge graph, the first subset having at least one guided-metapath neighbor corresponding to at least one node of the query graph, the first subset being the selected subset.

22. The method of claim 1, wherein the types of known terms of the multiple terms of the unstructured text snippet are determined by using an inverted index generated from the knowledge graph.

\* \* \* \* \*